(12) United States Patent
Xiong et al.

(10) Patent No.: US 11,968,713 B2
(45) Date of Patent: Apr. 23, 2024

(54) METHOD AND APPARATUS FOR TRANSMITTING AND RECEIVING SIGNAL IN WIRELESS COMMUNICATION SYSTEM

(71) Applicant: Samsung Electronics Co., Ltd., Suwon-si (KR)

(72) Inventors: Qi Xiong, Beijing (CN); Yi Wang, Beijing (CN); Chen Qian, Beijing (CN); Bin Yu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 596 days.

(21) Appl. No.: 17/275,020

(22) PCT Filed: Sep. 24, 2019

(86) PCT No.: PCT/KR2019/012394
§ 371 (c)(1),
(2) Date: Mar. 10, 2021

(87) PCT Pub. No.: WO2020/067696
PCT Pub. Date: Apr. 2, 2020

(65) Prior Publication Data
US 2022/0070930 A1 Mar. 3, 2022

(30) Foreign Application Priority Data

Sep. 26, 2018 (CN) .......................... 201811126358.3
Jan. 30, 2019 (CN) .......................... 201910094187.9

(51) Int. Cl.
*H04W 74/0816* (2024.01)
*H04W 52/14* (2009.01)
(Continued)

(52) U.S. Cl.
CPC ..... *H04W 74/0816* (2013.01); *H04W 52/146* (2013.01); *H04W 56/0045* (2013.01);
(Continued)

(58) Field of Classification Search
None
See application file for complete search history.

(56) References Cited

U.S. PATENT DOCUMENTS

2014/0056278 A1* 2/2014 Marinier ............. H04W 72/044
370/330
2018/0042048 A1* 2/2018 Hugl ..................... H04W 16/14
(Continued)

FOREIGN PATENT DOCUMENTS

EP          3 471 495 A1    4/2019
KR   10-2018-0102515 A      9/2018
(Continued)

OTHER PUBLICATIONS

LG Electronics Inc., "Transmission counting in MAC with LBT", R2-1810690,3GPP TSG-RAN WG2 NR Ad hoc 1807, Jun. 22, 2018.
(Continued)

*Primary Examiner* — Andre Tacdiran
(74) *Attorney, Agent, or Firm* — Jefferson IP Law, LLP

(57) ABSTRACT

The present disclosure provides a signal transmission/reception method, user equipment, and network equipment, the method including: determining, by a user equipment, an available random access occasion and a timing advance (TA) value; performing listen before talk (LBT) before a TA of the first available random access occasion; transmitting, if the LBT is successful, the random access preamble on the random access occasion.

18 Claims, 8 Drawing Sheets

(51) Int. Cl.
*H04W 56/00* (2009.01)
*H04W 72/0446* (2023.01)
*H04W 72/0453* (2023.01)
*H04W 74/08* (2009.01)

(52) U.S. Cl.
CPC ... *H04W 72/0446* (2013.01); *H04W 72/0453* (2013.01); *H04W 74/0891* (2013.01)

(56) References Cited

U.S. PATENT DOCUMENTS

| | | | |
|---|---|---|---|
| 2018/0263059 A1 | 9/2018 | Rosa et al. | |
| 2019/0313450 A1* | 10/2019 | Mukherjee | H04W 16/14 |
| 2019/0313457 A1* | 10/2019 | Tsai | H04L 5/0048 |
| 2020/0015316 A1* | 1/2020 | Islam | H04W 56/0045 |
| 2020/0053637 A1* | 2/2020 | Tsai | H04L 5/001 |
| 2020/0053682 A1* | 2/2020 | Abedini | H04W 56/0025 |
| 2020/0374835 A1* | 11/2020 | Gao | H04W 68/02 |
| 2020/0383147 A1* | 12/2020 | Yoon | H04L 27/2607 |
| 2021/0212125 A1* | 7/2021 | Lee | H04W 72/23 |
| 2021/0298086 A1* | 9/2021 | Jiang | H04W 74/0833 |
| 2021/0345424 A1* | 11/2021 | Cirik | H04W 74/02 |
| 2021/0352737 A1* | 11/2021 | Yang | H04W 74/0833 |
| 2022/0330335 A1* | 10/2022 | Ahn | H04W 74/0808 |

FOREIGN PATENT DOCUMENTS

| | | |
|---|---|---|
| WO | 2016/185275 A1 | 11/2016 |
| WO | 2018/045247 A1 | 3/2018 |

OTHER PUBLICATIONS

LG Electronics Inc., "Channel access procedure for NR unlicensed operation", R1-1808507, 3GPP TSG RAN WG1 Meeting #94, Aug. 11, 2018.
Samsung, Frame structure for NR-U, 3GPP TSG RAN WG1 Meeting #94, XP051516138, R1-1808765, Aug. 11, 2018.
LG Electronics, Channel access procedure for NR-U, 3GPP TSG RAN WG1 Meeting #98, XP051765143, R1-1908535, Aug. 17, 2019.
Extended European Search Report dated Nov. 5, 2021, issued in European Patent Application No. 19866766.9.
European Notice of Allowance dated Sep. 18, 2023, issued in European Patent Application No. 19866766.9.

* cited by examiner

METHOD AND APPARATUS FOR TRANSMITTING AND RECEIVING SIGNAL IN WIRELESS COMMUNICATION SYSTEM

TECHNICAL FIELD

The present disclosure relates to the field of wireless communication systems, and in particular, to a signal transmission/reception method, user equipment, and network equipment.

BACKGROUND ART

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

DISCLOSURE OF INVENTION

Technical Problem

In a NR-U system, or an unlicensed spectrum system, a user equipment attempting to transmit a random access preamble may cause its own LBT failure since other users transmit other uplink signals at the same time and perform advance timing, which may cause waste of random access resources and unfairly reduce the probability of random access preamble transmission. Therefore, some methods are needed to improve the probability of random access preamble transmission.

Solution to Problem

The present disclosure provides a signal transmission/reception method, user equipment, and network equipment, the method including: determining, by a user equipment, an available random access occasion and a timing advance (TA) value; performing listen before talk (LBT) before a TA of the first available random access occasion; transmitting, if the LBT is successful, the random access preamble on the random access occasion.

BRIEF DESCRIPTION OF DRAWINGS

The above and/or additional objects, features and advantages of the present disclosure will become more apparent through the description of the embodiments of the present disclosure with reference to the following accompanying draws, wherein.

BEST MODE FOR CARRYING OUT THE INVENTION

Figure 1:
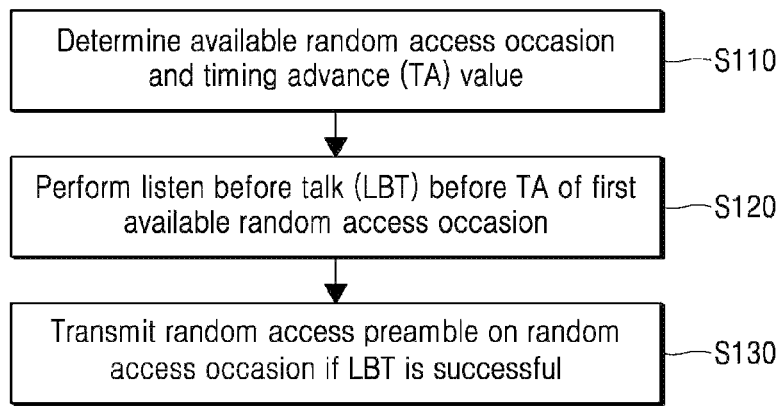
FIG. 1 is a schematic flow chart of a signal transmission method according to an embodiment of the present disclosure.

In that regard, according to an aspect, the present invention provides a signal transmission method, including:

determining an available random access occasion and a timing advance (TA) value; performing listen before talk (LBT) before a TA of the first available random access occasion; and transmitting, if the LBT is successful, the random access preamble on the random access occasion.

Preferably, the timing advance (TA) value includes one of the following: a maximum timing advance value that a timing advance command can indicate; a cell specific timing advance value configured by a network device; and a user equipment specific timing advance value configured by a network device.

Preferably, the method includes: performing, if the LBT fails, the LBT before the TA of the next available random access occasion.

Preferably, the method includes: determining, if the LBT fails, behavior(s) of a power ramping counter and/or a preamble transmission counter, according to a positional relationship of the next available random access occasion with respect to the previously available random access occasion of the next available random access occasion.

Preferably, determining behavior(s) of a power ramping counter and/or a preamble transmission counter, according to a positional relationship of the next available random access occasion with respect to the previously available random access occasion of the next available random access occasion, includes: adding to the power ramping counter and/or the preamble transmission counter when one of the following conditions exists: the next available random access occasion is the first available random access occasion in a time period; the next available random access occasion and the previously available random access occasion of the next available random access occasion belong to two different time periods; the interval between the next available random access occasion and the previously available random access occasion of the next available random access occasion is greater than or equal to a threshold, wherein the threshold is a pre-fixed time length, or a time length configured by the network side.

Preferably, the time period includes at least one of the following: a mapping period of a synchronization signal block to the random access occasion; a mapping pattern period of a synchronization signal block to the random access occasion; a random access configuration period; and a synchronization signal block period.

Preferably, the timing advance value includes one or more timing advance values, and the method further includes: determining priority information of an uplink signal; determining, according to the determined priority information of the uplink signal, the timing advance value TA_ul of the uplink signal; and performing the LBT before the TA_ul of a time-frequency resource of the uplink signal; transmitting, if the LBT is successful, the uplink signal, wherein the priority information of the uplink signal is obtained or preset by network device configuration information.

Preferably, the timing advance value of the uplink signal with a higher priority is greater than or equal to the timing advance value of the uplink signal with a lower priority The disclosure also provides a signal transmission method, including: determining a time-frequency resource position of an available random access occasion and a time-frequency resource position of an uplink signal to be transmitted; and puncturing, when there is frequency domain multiplexing between the time-frequency resource position of the uplink signal to be transmitted and the time-frequency resource position of the available random access occasion, on a time-frequency resource with frequency domain multiplexing on the time-frequency resource of the uplink signal to be transmitted.

Preferably, puncturing on a time-frequency resource with frequency domain multiplexing on the time-frequency resource of the uplink signal to be transmitted, includes: not performing uplink signal transmission on the time-frequency resource with frequency domain multiplexing on the time-frequency resource of the uplink signal to be transmitted, and/or, only performing the uplink signal transmission on the time-frequency resource without frequency domain multiplexing on the time-frequency resource of the uplink signal to be transmitted; or, not performing uplink signal transmission on the time-frequency resource of the uplink signal to be transmitted.

In addition, the present disclosure also provides a signal reception method, including: configuring a time-frequency resource and/or a timing advance value of an available uplink signal; and detecting a possible uplink signal on a time-frequency resource of the configured uplink signal.

The present invention further provides a user equipment including a processor and a memory storing computer executable instructions that, when executed by the processor, cause the processor to perform any of the foregoing methods.

The present invention further provides a computer readable medium, having computer executable instructions stored thereon that, when executed by a processor, causes the processor to perform any of the foregoing methods.

The present invention further provides a network device, including a processor and a memory storing computer executable instructions that, when executed by the processor, cause the processor to perform any of the foregoing methods.

Mode for the Invention

Embodiments of the present disclosure will be described in detail with reference to drawings hereafter. However, it should be understood that the description is illustrative, merely used for explaining the present application and should not be regarded as any limitations thereto. In addition, descriptions of well-known structures and techniques are omitted in the following description in order to avoid unnecessarily obscuring the concept of the present disclosure.

It should be understood by those skilled in the art that singular forms "a", "an", "the", and "said" may be intended to include plural forms as well, unless otherwise stated. It should be further understood that terms "include/including" used in this specification specify the presence of the stated features, integers, steps, operations, elements and/or components, but not exclusive of the presence or addition of one or more other features, integers, steps, operations, elements, components, and/or combinations thereof. It should be understood that when a component is referred to as being "connected to" or "coupled to" another component, it may be directly connected or coupled to other elements or provided with intervening elements therebetween. In addition, "connected to" or "coupled to" as used herein may include wireless connection or coupling. As used herein, term "and/or" includes all or any of one or more associated listed items or combinations thereof.

Those skilled in the art will appreciate that all terms (including technical terms and scientific terms) used herein have the same meaning as commonly understood by one of ordinary skill in the art belonging to the field of the present invention, unless otherwise defined. It should also be understood that those terms, such as those defined in a general dictionary, should be understood as having a meaning consistent with the meaning in the context of the prior art, and it is not intended to be construed in an idealized or overly formal sense unless specifically defined herein.

Those skilled in the art may understand that the "terminal" and "terminal equipment" as used herein include both a wireless signal receiver device only having a wireless signal receiver without a transmitting capability, and a receiving and transmitting hardware having a device capable of receiving and transmitting hardware for two-way communication over a two-way communication link. Such device may include: a cellular or other communication device having a single line display or a multi-line display, or a cellular or other communication device without a multi-line display; a PCS (Personal Communications Service), which may combine voice, data processing, fax and/or data communication capabilities; a PDA (Personal Digital Assistant), which may include a radio frequency receiver, a pager, Internet/Intranet access, a web browser, a notepad, a calendar, and/or a GPS (Global Positioning System (Global Positioning System) receiver; a conventional laptop and/or a palmtop computer or other devices having and/or including a radio frequency receiver. As used herein, "terminal" and "terminal equipment" may be portable, transportable, installed in a vehicle (in aviation, sea and/or land), or adapted and/or configured to operate locally, and/or operated in any other position on the earth and/or space in a distributed form. As used herein, "terminal" and "terminal equipment" may also be a communication terminal, an internet terminal, and a music/video playing terminal, for example, a PDA, a MID (Mobile Internet Device), and/or a mobile phone having a music/video playback function, and may also be a smart TV, a set-top box and other devices.

A time unit in the present invention may be: one OFDM symbol, one OFDM symbol group (consisting of multiple OFDM symbols), one slot, one slot group (consisting of multiple slots), one subframe, one subframe group (consisting of multiple sub-frames), one system frame, one system frame group (consisting of multiple system frames); or may be an absolute time unit, such as 1 millisecond, 1 second, etc.; the time unit can also be a combination of multiple granularities, for example, N1 slots plus N2 OFDM symbols.

A frequency domain unit in the present invention may be: one subcarrier, one subcarrier group (consisting of multiple subcarriers), and one resource block (RB), also referred to as a physical resource block (PRB), a resource block group (consisting of multiple RBs), a bandwidth part (BWP), a bandwidth part group (consisting of multiple BWPs), a bandwidth/carrier, a bandwidth group/carrier group; or may be an absolute frequency domain unit, such as 1 Hz, 1 kHz, etc.; the frequency domain unit can also be a combination of multiple granularities, for example, M1 PRBs plus M2 subcarriers.

In order to meet a huge service traffic demand, 5G communication system is expected to work on resources from low frequency bands up to high frequency bands about 100 G, including licensed frequency bands and unlicensed frequency bands. Wherein, the unlicensed frequency bands mainly consider frequency bands at 5 GHz and 60 GHz. A 5G system operating in unlicensed frequency bands is referred to as an NR-U system, which can include a scenario that the system operates independently on unlicensed frequency bands, as well as a scenario that the system operates by means of dual connectivity (DC) with licensed frequency bands, and may also include a scenario that the system operates by means of carrier aggregation (CA) with licensed frequency bands. In 5 GHz frequency bands, a Wireless Fidelity (WiFi) system in 802.11 series, radar, and LTE's Licensed-Assisted Access (LAA) system have been deployed, all of which follow Listen before talk (LBT) mechanism, that is, a radio channel must be detected before transmitting a signal, and the radio channel can be occupied for transmitting a signal only when the radio channel is detected to be idle. In 60 GHz frequency bands, since 802.11ay systems already exist, the LBT mechanism is also required to be followed. In other unlicensed frequency bands, an effective coexistence method shall be established according to a corresponding standard.

The LBT mechanism can be classified into two types. One is referred to as a first type LBT, commonly known as Category 4 LBT (TS 36.213 15.2.1.1), which determines a collision window size (CWS) and randomly generates a backoff factor X. If X carrier monitoring slots (CCA slots) are idle, a signal can be transmitted. The first type LBT is classified into four LBT priority classes, which correspond to different Quality criterion indicators (QCIs). Different LBT priority classes, have different CWS sizes (that is, different sets of CW values), different defer periods (a defer period is equal to 16+9*n microseconds, and n is an integer greater than or equal to 1), and different maximum channel occupancy time (MCOT). The other is referred to as a second type LBT (TS 36.213 15.2.1.2), in which a transmission terminal only needs to perform Clear Channel Assessment (CCA) detection for 25 μs before starting to transmit signals, which is defined by the standard, and if the channel is idle, signals are transmitted.

Moreover, in 5G system, the concept of a bandwidth part (BWP) is introduced. The transmission and reception of UE are performed within one BWP. The downlink reception is performed within a DL BWP, and the uplink transmission is performed within a UL BWP. A BWP can be equal to the system bandwidth or a part of the system bandwidth of the carrier. A base station can configure multiple BWPs for the UE, but the transmission and reception of UE can only performed within one BWP at a time. Such a BWP is referred to as an active BWP (active BWP). The base station can dynamically indicate the active BWP by using dynamic signaling, for example, a DL grant or UL grant for scheduling downlink or uplink data, or can defer to a default BWP by using a predefined timer. Certainly, it is not excluded that the transmission and reception of a UE capable of being strong in a 5G system or other systems can be performed on multiple BWPs at same time. The frequency domain resources occupied by BWPs of respective UEs may be identical or unidentical. The difference of frequency domain resources occupied by the BWP of the UE may be overlapping but not completely overlapping, or even not overlapping in frequency domain resources. The bandwidths of BWPs of UEs may be identical or unidentical. On a base station side, the base station can usually perform transmission and reception on BWPs of multiple UEs. For example, from the perspective of a base station, there is a carrier of 80 MHz bandwidth, which can be divided into four nonoverlapping sub-bands, each sub-band with 20 MHz. For a UE, one subband is a BWP. One or more BWPs occupied by each downlink transmission of the base station may be different, for example, UEs served by different downlink transmissions are different, so BWPs may be different; or different downlink transmissions serve a same UE, but the BWP of the UE is changing.

Meanwhile, in 5G communication system, in addition to transmitting a random access preamble signal, when transmitting other uplink signals (e.g., a physical uplink shared channel signal), a user equipment (UE, also referred to as a user) needs to transmit signals according to the obtained timing advance (TA) value, for example, to transmit data according to downlink synchronization time and a time advance (TA), so that the time when uplink signals arrive at the base station are basically same. The timing advance value can be obtained in two manners, and one is obtained from a timing advance command (TA command) in a random access feedback message, for example, a 12-bit timing advance command, in a random access process; the other is a time advance value that needs to be used for subsequent transmission based on adjusting an old timing advance value and the obtained timing advance command (e.g., 6-bit TA command). However, the user equipment does not use the timing advance value, when transmitting a random access preamble signal.

The transmission in wireless communication system includes: transmission (referred to as downlink transmission) from a base station (gNB) to a user equipment (UE), of which the corresponding slot is referred to as a downlink slot, and transmission (referred to as uplink transmission) from a UE to a base station, of which the corresponding slot is referred to as an uplink slot.

In downlink communication of a radio communication system, the system periodically transmits a synchronization signal and a broadcast channel to the user through a synchronization signal/PBCH block (SSB), which the periodicity is a synchronization signal block periodicity (SSB periodicity), or SSB burst periodicity. Meanwhile, the base station configures a random access configuration period (PRACH configuration period), and configures a certain number of random access transmission occasions (also referred to as random access occasions, PRACH transmission occasion, RO) within the period, which satisfy that all SSBs can be mapped to the corresponding RO within a mapping period (a certain length of time).

In a new radio (NR) communication system, the performance of random access directly influences user's experience before radio resource control is established, for example, during random access. In a conventional wireless communication system, for example, LTE or LTE-Advanced, a random access process is used in various scenarios such as establishment of an initial link, cell handover, reestablishment of an uplink, and RRC connection reestablishment, and is classified into Contention-based Random Access and Contention-free Random Access, depending upon whether a user monopolizes preamble sequence resources. Since, for the contention-based random access, each user selects a preamble sequence from same preamble sequence resources when trying to establish an uplink, there may be a case in which multiple users select and transmit a same preamble sequence to the base station. Therefore, the collision resolution mechanism becomes an important research direction in the random access. How to reduce the collision probability and how to quickly solve a collision that has occurred are key indicators influencing the random access performance.

Figure 3:
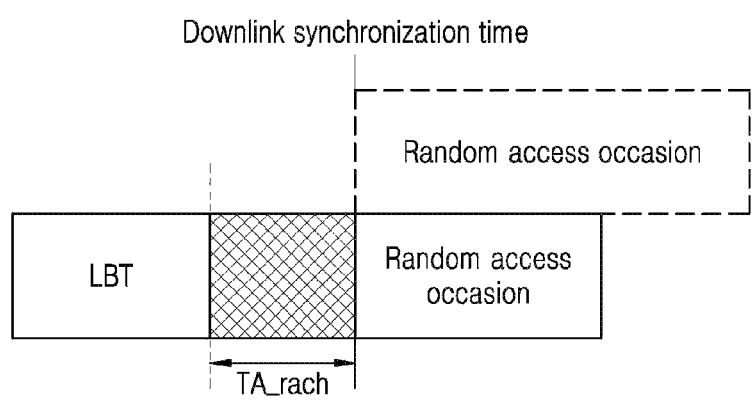
FIG. 3 is a diagram showing an example of performing LBT by using TA_rach.

The contention-based random access process in LTE-A includes four steps, as shown in FIG. 3. In the first step, a user randomly selects one preamble sequence from a preamble sequence resource pool and transmits the preamble sequence to a base station. The base station performs correlation detection on the received signal, so as to identify the preamble sequence transmitted by the user. In the second step, the base station transmits a Random Access Response (RAR) to the user, the RAR containing an identifier of a random access preamble sequence, a timing advance instruction determined according to a time delay between the user and the base station, a Cell-Radio Network Temporary Identifier (C-RNTI), and time-frequency resources allocated for the user to perform uplink transmission next time. In the third step, the user transmits a third message (Msg3), to the base station according to the information in the RAR. The Msg3 contains information such as a user equipment terminal identifier and an RRC link request, wherein the user equipment terminal identifier is an identifier that is unique to the user and used for resolving collision. In the fourth step, the base station transmits a collision resolution identifier to the user, the collision resolution identifier containing a user equipment identifier corresponding to a user who wins in the collision resolution. The user upgrades TC-RNTI to C-RNTI upon detecting its identifier, and transmits an Acknowledgment (ACK) signal to the base station to complete the random access process and waits for the scheduling of the base station. Otherwise, the user will start a new random access process after a certain delay.

For a contention-free random access process, since the base station has known the identifier of the user, it can allocate a preamble sequence to the user. Thus, when transmitting a preamble sequence, the user does not need to randomly select a sequence, and instead, it use the allocated preamble sequence. Upon detecting the allocated preamble sequence, the base station will transmit a corresponding random access response, the random access response including information such as timing advance and uplink resource allocation. Upon receiving the random access response, the user considers that the uplink synchronization has been completed, and waits for the further scheduling of the base station. Therefore, the contention-free random access process contains only two steps: a first step of transmitting a preamble sequence, and a second step of transmitting a random access response.

The random access process in LTE is applicable to the following scenarios:
1. initial access under RRC_IDLE;
2. reestablishment of RRC connection;
3. cell handover;
4. the downlink data arrives and a random access process is requested (when the uplink is nonsynchronous) in an RRC connected state;
5. the uplink data arrives and a random access process is requested (when the uplink is nonsynchronous or no source is allocated for a scheduling request in a PUCCH resource) in an RRC connected state; and
6. positioning.

Figure 2:
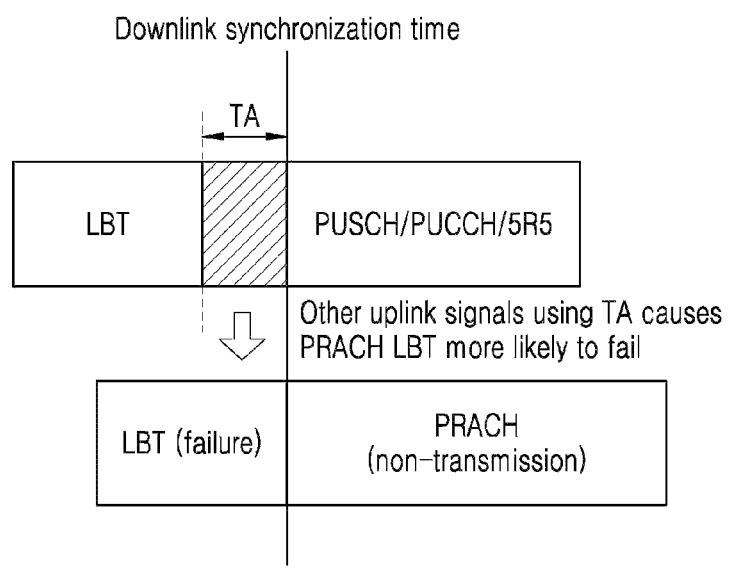
FIG. 2 is a diagram showing an example of failure of a PRACH LBT caused by other uplink signal interference.

However, in a NR-U system, or an unlicensed spectrum system, a user equipment attempting to transmit a random access preamble may cause its own LBT failure since other users transmit other uplink signals at the same time and perform advance timing, which may cause waste of random access resources and unfairly reduce the probability of random access preamble transmission, as shown in FIG. 2. Therefore, some methods are needed to improve the probability of random access preamble transmission.

In order to make purposes, technical solutions and advantages of the present application more clearly, the embodiments of the present application will be further described in detail below with reference to the accompanying drawings.

Embodiment 1

The embodiment of the present application provides a signal transmission method. As shown in FIG. 1, the method includes: Step S110, determining an available random access occasion and a timing advance (TA) value; step S120, performing listen before talk (LBT) before a TA of the first available random access occasion; and S130, transmitting, if the LBT is successful, the random access preamble on the random access occasion.

For a new system, for example, an unlicensed spectrum NRU system, the user equipment may perform LBT before uplink transmission and then transmit an uplink signal; when transmitting other uplink signals other than PRACH, such as a Physical Uplink Share Channel (PUSCH), a Physical Uplink Control Channel (PUCCH), and a sounding reference signal (SRS), the timing advance may be used so that the PRACH transmission is more likely to fail the LBT without using the time advance at the same time, which causes the PRACH to fail to be transmitted. The present invention provides a signal transmission/reception method. When the user equipment performs random access preamble transmission in an unlicensed spectrum system, for example, a NRU system, the present invention proposes that the user equipment may transmit random access preamble according to the timing advance value configured by a network equipment or a preset timing advance value. This allows the transmission of the PRACH to have a higher priority to obtain a higher probability of successful transmission.

Specifically, in this embodiment, the UE obtains configuration information of the network from the network side through system information, an RRC configuration message or the downlink control channel, and includes at least one of the following:
  random access configuration information, including at least one of the following:
  a random access configuration period;
  a random access occasion time unit index (e.g., a slot index, a symbol index, a subframe index, etc.);
  a random access occasion frequency domain unit index (e.g., a carrier index, a BWP index, a PRB index, a subcarrier index, etc.);
  the number of random access occasions;
  random access preamble format (e.g., cyclic prefix (CP) length, preamble sequence length and repetition number, guard interval GT length, used subcarrier size, etc.);
  the number of random access preambles, a root sequence index, and a cyclic shift value;
  the number of SSBs that can be mapped on random access occasions;
  SSB configuration information, including at least one of the following:
  SSB period size;
  the number of SSBs transmitted during one SSB period;
  time unit positions of SSBs transmitted within one SSB period;
  frequency domain unit positions of SSBs transmitted within one SSB period;
  a timing advance value TA_rach;
  in particular, the TA_rach may be included in the random access configuration information;
  LBT configuration information, including at least one of the following:
  LBT priority information;
  time length implementing the LBT T_lbt;
  time length that can user channel resources after the LBT is completed.

The UE can obtain the mapping information of the SSB to the RO based on the foregoing configuration information, and the mapping information includes at least one of the following:
  a mapping period of the SSB to the RO (e.g., the number of random access configuration periods required to complete at least one SSB-to-RO mapping);
  a mapping pattern period of the SSB to the RO (e.g., time length ensuring same SSB-to-RO mapping in adjacent two mapping pattern periods, the number of required SSB-to-RO mapping periods, or the number of required random access configuration period).

The UE selects one SSB (i.e., obtains its SSB index), and SSB-RO mapping relationship (i.e., specifies the position and number of ROs corresponding to a certain SSB), and determines available random access occasions, that is, determining one or more random access signal occasions (PRACH occasions, RO) that are currently available for the selected SSB; in particular, the above-mentioned available random access occasions are all determined by the UE according to the SSB-RO mapping relationship. The determined valid random access occasion is determined by the UE based on uplink and downlink configuration information configured by the network device and/or configuration information of the SSB, as determined by the UE.

1. An uplink part, which is indicated by the uplink and downlink configuration information only in an uplink and downlink configuration period, of the random access occasion obtained from the random access configuration, is the valid random access occasion; or, 2. A non-downlink part, which is indicated by the uplink and downlink configuration information only in an uplink and downlink configuration period, of the random access occasion obtained from the random access configuration, is the valid random access occasion; or, 3. A part after one or more time units after the downlink part ending, which is indicated by the uplink and downlink configuration information only in an uplink and downlink configuration period, of the random access occasion obtained from the random access configuration, is the valid random access occasion; or, 4. A part after one or more time units after the last SSB in the SSB configuration information, which is indicated by the uplink and downlink configuration information only in an uplink and downlink configuration period, of the random access occasion obtained from the random access configuration, is the valid random access occasion.

The UE performs the LBT before determining the starting position of the one or more recent available random access signal occasions, that is, indicating that the starting position is T_dl (may also indicate that the starting position is the time when the downlink synchronization time is 0, i.e., T_dl=0), and then the UE performs the LBT in the T_lbt time before T_dl+TA_rach, wherein T_lbt can be indicated by the LBT configuration information, as shown in FIG. 3. In particular:

1. TA_rach is used to advance the LBT time when the UE transmits the PRACH in one of the following cases:
   a) when the PRACH is transmitted in a primary cell (Pcell); or,
   b) in a primary secondary cell (Pscell); or,
   c) in a secondary network (Scell);
2. and/or the UE uses TA_rach to advance the LBT time in one of the following random access trigger events:
   a) beam failure recovery request;
   b) random access triggered by the downlink control channel;
   c) scheduling request;
   d) initial access under RRC_IDLE;
   e) reestablishment of RRC connection;
   f) cell handover;
   g) the downlink or uplink data arrives and a random access process is requested (when the uplink is non-synchronous) in an RRC connected state;
   h) positioning.

Wherein, the TA_rach can be:
1. a maximum timing advance value that the timing advance command can indicate;
2. a cell-specific timing advance value configured by the network device (e.g., a cell-specific timing advance value set by considering a cell coverage, and/or inter-cell interference condition);
3. a user equipment specific timing advance value configured by the network device.

If the LBT is successful, the UE transmits a random access preamble on the current RO according to the configured preamble format; and calculates a RA-RNTI for subsequent search for a random access feedback based on the time-frequency position index of the RO that transmits the preamble. The UE obtain a timing advance value TA_rar indicated by the TA command of the network configuration from the random access feedback, and the UE determines its actual timing advance value TA_actual=TA+TA_rar; wherein if the TA_rar is configured as a negative number, it means that TA_actual is smaller than the configured TA; if TA_rar is configured as a positive number, it means that TA_actual is greater than the configured TA; if TA_rar is configured to zero, it means TA_actual=TA. In particular, it can also be expressed as the actual timing advance value TA_actual=TA-TA_rar, wherein, if TA_rar is configured as a negative number, it means that TA_actual is greater than the configured TA; if TA_rar is configured as a positive number, it means that TA_actual is smaller than the configured TA; if TA_rar is set to zero, it means TA_actual=TA.

If the LBT fails, the UE finds the next available RO corresponding to the selected SSB mapping, which is denoted as RO_x. According to the above method, the LBT is performed before the starting position of the RO_x, that is, indicating that the starting position is T_dl (may also indicate that the starting position is the time when the downlink synchronization time is 0, i.e., T_dl=0), and then the UE performs the LBT in the T_lbt time before T_dl+TA_rach, as shown in FIG. 3.

When RO_x is the first RO corresponding to the selected SSB mapping in the time period in which RO_x is located, the UE needs to perform at least one of the following:
   the power ramping counter is added by 1 and/or the preamble transmission counter is unchanged;
   the power ramping counter is added by 1 and/or the preamble transmission counter is added by 1;
   the power ramping counter is unchanged and/or the preamble transmission counter is added by 1; when RO_x is not the first RO corresponding to the selected SSB mapping in the time period in which RO_x is located, the UE needs to keep the power ramping counter unchanged and/or the preamble transmission counter unchanged.

Figure 4:
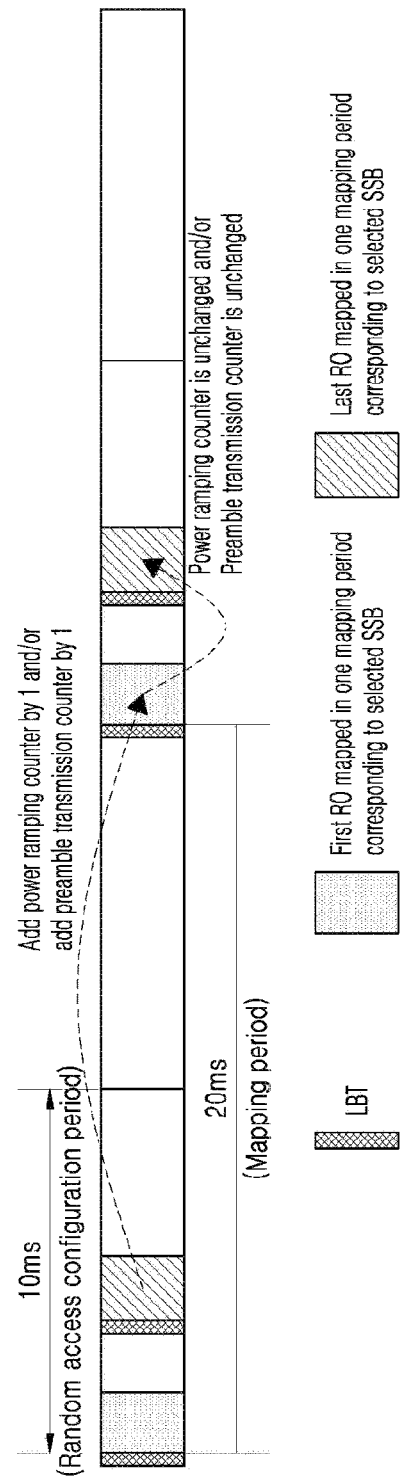
FIG. 4 is a diagram showing an example of a change of a power ramping counter and a preamble transmission counter.

The time period may be: a random access configuration period, an SSB-to-RO mapping period, and an SSB-to-RO mapping pattern period; FIG. 4 shows an example as using an SSB-to-RO mapping period.

In particular, the above condition can be replaced by whether RO_x belongs to a different time period from the previous RO that attempting the LBT; that is:
   when RO_x belongs to a different time period from the previous RO that attempting the LBT, the UE needs to perform at least one of the following:
   the power ramping counter is added by 1 and/or the preamble transmission counter is unchanged;
   the power ramping counter is added by 1 and/or the preamble transmission counter is added by 1;
   the power ramping counter is unchanged and/or the preamble transmission counter is added by 1
   when RO_x belongs to a same time period with the previous RO that attempting the LBT, the UE needs to keep the power ramping counter unchanged and/or the preamble transmission counter unchanged.

Specifically, the above condition may also be replaced by whether the interval of RO_x and the previous RO attempting the LBT exceeds a certain time interval N_t; that is:
   when the interval of RO_x and the previous RO attempting the LBT exceeds N_t, the UE needs to perform at least one of the following:
   the power ramping counter is added by 1 and/or the preamble transmission counter is unchanged;
   the power ramping counter is added by 1 and/or the preamble transmission counter is added by 1;
   the power ramping counter is unchanged and/or the preamble transmission counter is added by 1;
   when the interval of RO_x and the previous RO attempting the LBT does not exceed N_t, the UE needs to keep the power ramping counter unchanged and/or the preamble transmission counter unchanged.

Wherein, the time interval N_t may be obtained by the UE from the network through RRC high-level signaling or physical layer control signaling configuration, or a fixed value N_t preset by the UE: for example, N_t=10 ms, N_gap+N_rarwindow+N_1+N_new+L2 (N_gap is the interval for transmitting the last symbol of the preamble to the starting position of the RAR window, and N_rarwindow is the size of the RAR search window; N_1+N_new+L2 includes the physical layer and the upper layer processing delay of the UE), etc.

In particular, the above conditions may also be replaced by that the UE has M consecutive LBT failures of the ROs; which is:
   when the number of LBT failures of the UE continuous RO reaches M (for example, the LBT counter of the RO is added by 1 after each LBT failure of the RO until the value of the counter is greater than or equal to the network configured or preset M value), then The UE needs to perform at least one of the following:
   the power ramping counter is added by 1 and/or the preamble transmission counter is unchanged;
   the power ramping counter is added by 1 and/or the preamble transmission counter is added by 1;
   the power ramping counter is unchanged and/or the preamble transmission counter is added by 1 when the number of LBT failures of the UE continuous RO does not reach M, the UE needs to keep the power ramping counter unchanged and/or the preamble transmission counter unchanged.

The UE continues to perform LBT on the available ROs until the LBT succeeds, and the UE transmits a random access preamble; or the LBT fails to a certain number of times or the number of random access preamble transmissions reaches a maximum value (i.e., the preamble transmission counter value is equal to a maximum number of preamble transmissions configured by the network) or the initial access timer expires (the initial access timer is started from the time when the UE first performs the RO of the LBT until the time limit of the network configuration is reached, and the initial access timer expires), and the UE reports a random access problem or the UE directly performs cell reselection.

Embodiment 2

Specifically, in this embodiment, the UE determines a signal to be transmitted, or a puncture part to be transmitted, by determining a positional relationship between the random access occasion and the scheduled time-frequency resource.

The UE obtains configuration information of the network from the network side through system information, an RRC configuration message or the downlink control channel, and includes at least one of the following:
random access configuration information, including at least one of the following:
a random access configuration period;
a random access occasion time unit index (e.g., a slot index, a symbol index, a subframe index, etc.);
a random access occasion frequency domain unit index (e.g., a carrier index, a BWP index, a PRB index, a subcarrier index, etc.);
the number of random access occasions;
random access preamble format (e.g., cyclic prefix (CP) length, preamble sequence length and repetition number, GT length, used subcarrier size, etc.);
the number of random access preambles, a root sequence index, and a cyclic shift value;
the number of SSBs that can be mapped on random access occasions;
SSB configuration information, including at least one of the following:
SSB period size;
the number of SSBs transmitted during an SSB period;
time unit positions of SSBs transmitted within one SSB period;
frequency domain unit positions of SSBs transmitted within one SSB period;
a timing advance value TA_rach;
LBT configuration information;
LBT priority information;
time length implementing the LBT;
time length that can user channel resources after the LBT is completed.

The UE can obtain the mapping information of the SSB to the RO based on the foregoing configuration information, and the mapping information includes at least one of the following:
a mapping period of the SSB to the RO (e.g., the number of random access configuration periods required to complete at least one SSB-to-RO mapping);
a mapping pattern period of the SSB to the RO (e.g., time length ensuring same SSB-to-RO mapping in adjacent two mapping pattern periods, the number of required SSB-to-RO mapping periods, or the number of required random access configuration period).

Figure 5:
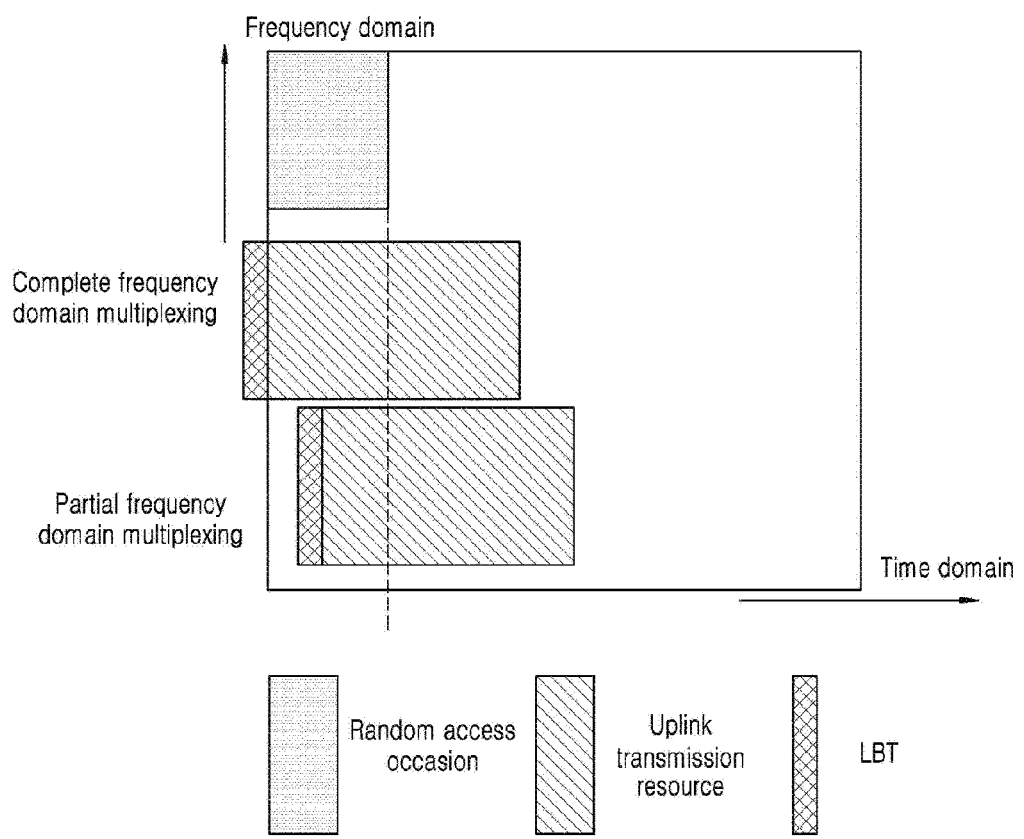
FIG. 5 is a diagram showing an example of frequency domain multiplexing of uplink signal transmission and PRACH resources.
Figure 6:
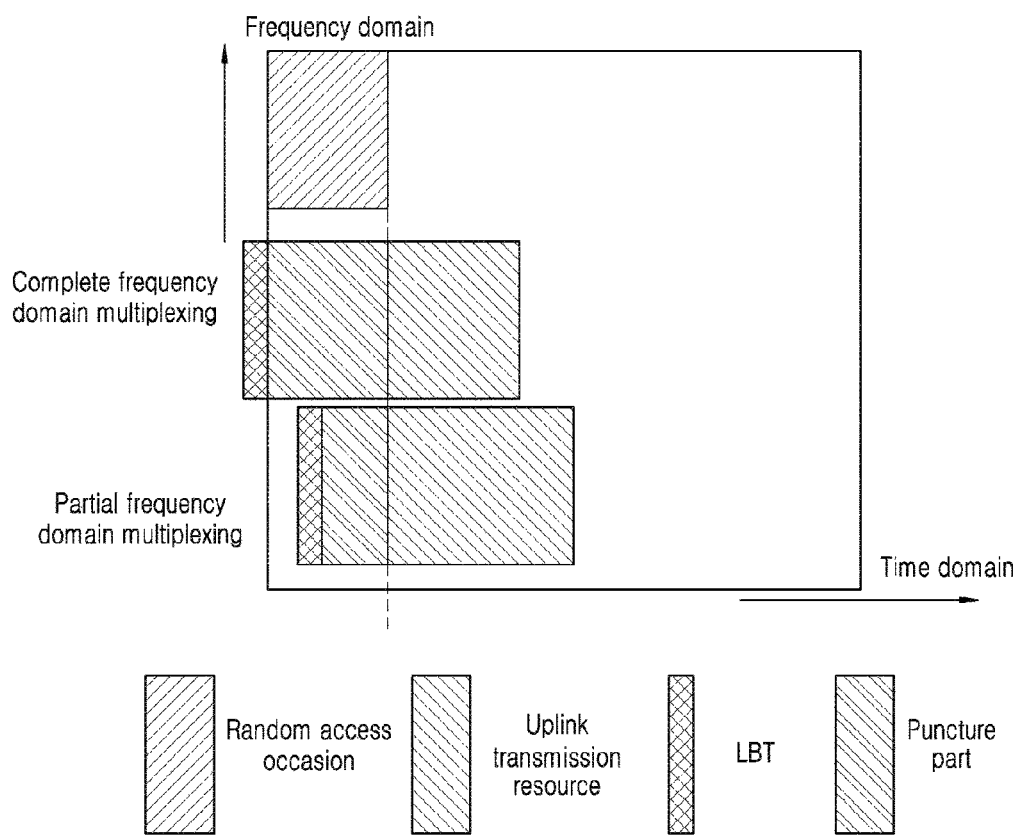
FIG. 6 is a diagram showing an example of partial punching of frequency domain multiplexing in an uplink signal transmission.
Figure 7:
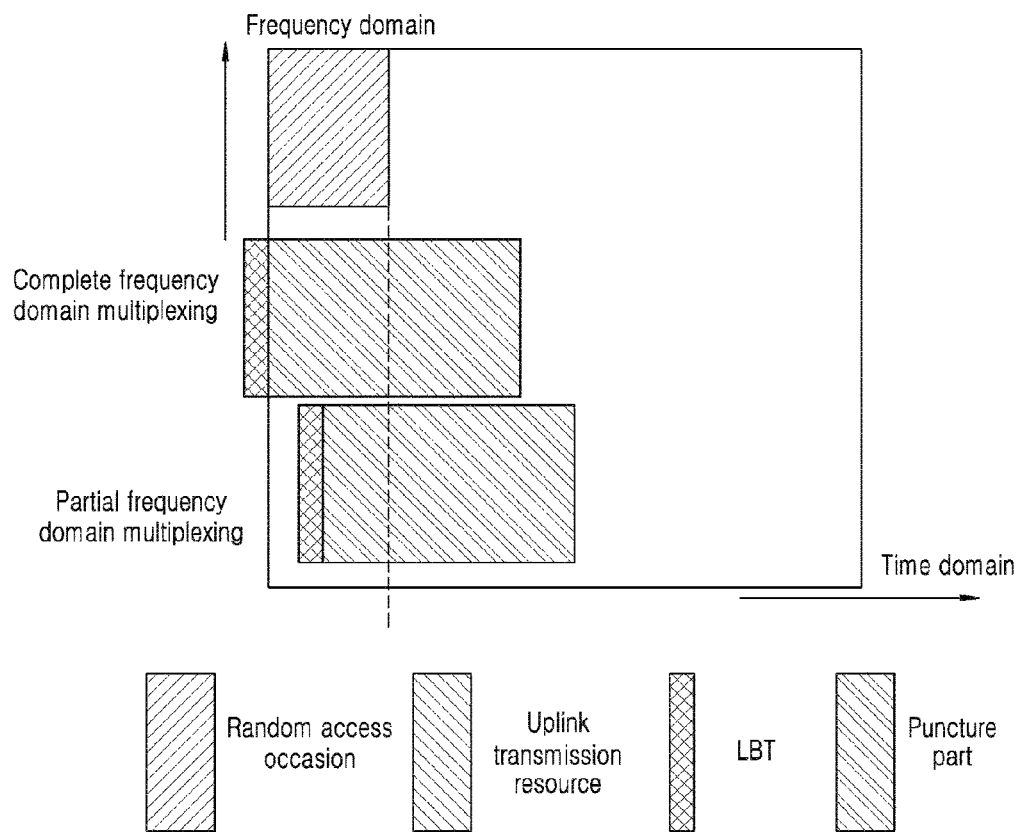
FIG. 7 is a diagram showing an example of complete punching frequency domain multiplexing in an uplink signal transmission.

When the UE receives the uplink scheduling information (dynamically indicated uplink transmission time-frequency resources) from the network, or for the mechanism of schedule-free uplink transmission (pre-configuration or RRC high-level signaling configures time-frequency resource for uplink transmission), the UE can transmit uplink time signals (such as PUSCH, PUCCH, SRS) on the time-frequency resource at the N time. When the following occurs:
the time-frequency resource position of the uplink transmission by the UE and the random access time-frequency resource position configured by the network side (that is, the time-frequency resource position of the random access occasion) have a partial or all frequency domain multiplexing relationship (i.e., there is an overlap for the two resources in time), as shown in FIG. 5; wherein the time-frequency resource position of the uplink transmission may be an uplink resource that has successfully performed the LBT, or an uplink resource that has not performed the LBT;
Then the UE can:
1. puncture the part, of which frequency domain is multiplexed, of the uplink signal and the random access time-frequency resource, and transmit the uplink signal only in the place where there is no frequency domain multiplexing, as shown in FIG. 6; in particular, the LBT can be performed before a time position that starting actually transmitting.
2. The transmission of the uplink signal is completely punctured, that is, not transmitted, as shown in FIG. 7.

Embodiment 3

Specifically, in this embodiment, the UE performs the LBT and subsequent uplink transmission, by using a method of using different configured timing advance values for different uplink signal transmissions.

The UE obtains configuration information of the network from the network side through system information, an RRC configuration message or the downlink control channel, and includes at least one of the following:
random access configuration information, including at least one of the following:
a random access configuration period;
a random access occasion time unit index (e.g., a slot index, a symbol index, a subframe index, etc.);
a random access occasion frequency domain unit index (e.g., a carrier index, a BWP index, a PRB index, a subcarrier index, etc.);
the number of random access occasions;
random access preamble format (e.g., cyclic prefix (CP) length, preamble sequence length and repetition number, GT length, used subcarrier size, etc.);
the number of random access preambles, a root sequence index, and a cyclic shift value;
the number of SSBs that can be mapped on random access occasions;
SSB configuration information, including at least one of the following:
SSB period size;
the number of SSBs transmitted during an SSB period;
time unit positions of SSBs transmitted within one SSB period;
frequency domain unit positions of SSBs transmitted within one SSB period;

a timing advance value group for different uplink signals, including at least one of the following:
a timing advance value of PRACH: TA_rach;
a timing advance value of PUCCH: TA_PUCCH;
a timing advance value of PUSCH: TA_PUSCH;
a timing advance value of SRS: TA_SRS;

Specifically, in the timing advance value group, the UE determines the timing advance value of the transmission signal according to the priority of transmitting the uplink signal. For example, the configuration information includes four timing advance values (TA1, TA2, TA3, TA4, and TA1<TA2<TA3<TA4, that is, TA4 corresponds a signal with highest priority). In such a case, the priority is that PRACH on Pcell>PUCCH>PUSCH>SRS>PRACH on Scell; PRACH on Pcell uses TA4, i.e., TA_rach=TA4; PUCCH uses TA3, i.e., TA_PUCCH=TA3; PUSCH uses TA2, i.e., TA_PUSCH=TA2; SRS and PRACH on Scell uses TA1, i.e., TA_SRS=TA1, TA_rach=TA1; in particular, the priority can be classified by service types, for example, PUCCH_URLLC has higher priority than PUCCH_eMBB; the priority information of the signal can be notified by the network configuration to the UE, or fixed, or determined by the.

LBT configuration information;
LBT priority information;
time length implementing the LBT T_lbt;
time length that can user channel resources after the LBT is completed.

The UE can obtain the mapping information of the SSB to the RO based on the foregoing configuration information, and the mapping information includes at least one of the following:

a mapping period of the SSB to the RO (e.g., the number of random access configuration periods required to complete at least one SSB-to-RO mapping);

a mapping pattern period of the SSB to the RO (e.g., time length ensuring same SSB-to-RO mapping in adjacent two mapping pattern periods, the number of required SSB-to-RO mapping periods, or the number of required random access configuration period).

The UE selects one SSB (i.e., obtains its SSB index), and SSB-RO mapping relationship (i.e., specifies the position and number of ROs corresponding to a certain SSB), and determines available random access occasions, that is, determining one or more random access signal occasions (PRACH occasions, RO) that are currently available for the selected SSB; the UE performs the LBT before determining one or more random access signal occasions, that is, the downlink synchronization time is represented as time T_dl (the downlink synchronization time may also be represented as time 0, that is, T_dl=0). Then the UE can perform the LBT in the T_lbt time before T_dl+TA_rach, which T_lbt can be indicated by the LBT configuration information, as shown in FIG. 3.

When performing PUCCH, PUSCH, or SRS transmission, the UE performs the LBT by using the corresponding configured TA_PUCCH, TA_PUSCH or TA_SRS respectively. Specifically, the UE may:

1. at T_dl+TA_actual+TA_PUCCH/TA_PUSCH/TA_SRS; or,
2. in T_lbt time before T_dl+TA_PUCCH/TA_PUSCH/TA_SRS, perform the LBT;
if the LBT is successful, perform the transmission of the corresponding uplink signal (PRACH, PUCCH, PUSCH, or SRS);
if the LBT fails, wait for a while and then attempt the LBT again; or discard the transmission.

Embodiment 4

This embodiment describes a method for a UE to determine available random access time-frequency resources.

Figure 10:
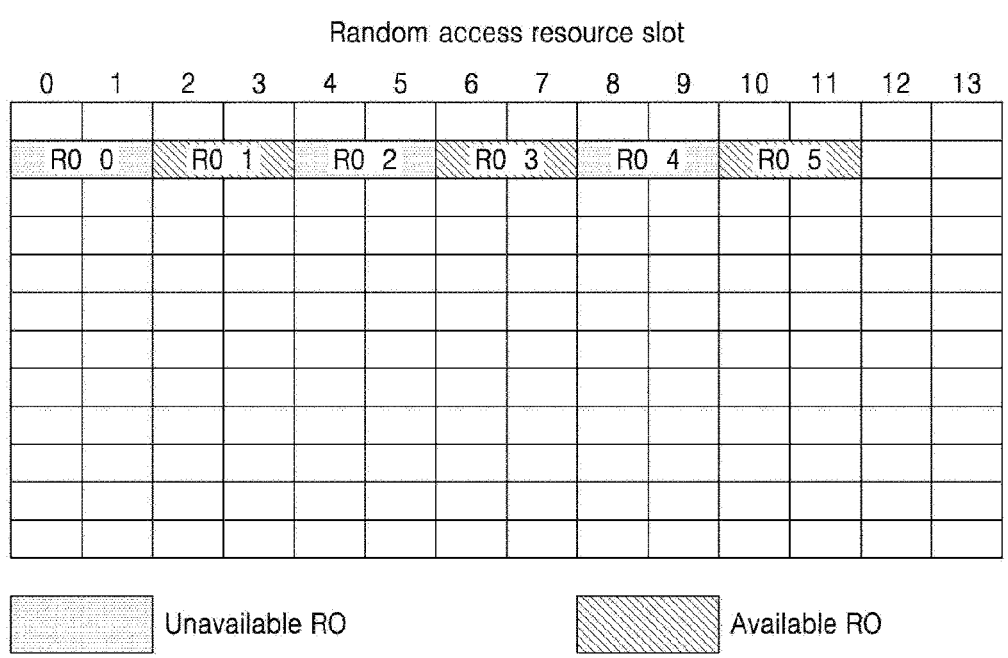
FIG. 10 is a diagram showing an example of available random access occasion indications.

The UE obtains configuration information of the network from the network side through system information, an RRC configuration message or the downlink control channel, and includes at least one of the following:

random access configuration information, including at least one of the following:
a random access configuration period;
a random access occasion time unit index (e.g., a slot index, a symbol index, a subframe index, etc.);
a random access occasion frequency domain unit index (e.g., a carrier index, a BWP index, a PRB index, a subcarrier index, etc.);
the number of random access occasions;
random access preamble format (e.g., cyclic prefix (CP) length, preamble sequence length and repetition number, GT length, used subcarrier size, etc.);
the number of random access preambles, a root sequence index, and a cyclic shift value;
the number of SSBs that can be mapped on random access occasions;
a random access occasion indication that can be used, for example:

Odd: represents that random access occasion, of which the access random access occasion time unit and/or a frequency domain unit index is odd, is available random access occasion; as shown in FIG. 10, there are 6 ROs in one RACH slot, wherein the odd indexes are available and the ROs of the even indexes are unavailable ROs, so that the adjacent ROs are discontinuous, and the UE can perform the LBT on the unavailable ROs, avoiding the interference from a subsequent RO and a high probability of the LBT failure since a previous RO being selected by other users.

In particular, an indication indicating the RACH slot index available in a random access period may also be included.

Even: represents that random access occasion, of which the access random access occasion time unit and/or a frequency domain unit index is even, is available random access occasion All: represents that all random access occasions, of which the access random access occasion time units and/or a frequency domain unit indexes are even, are available.

None: represents that all random access occasions, of which the access random access occasion time units and/or a frequency domain unit indexes are even, are unavailable.

SSB configuration information, including at least one of the following:
SSB period size;
the number of SSBs transmitted during an SSB period;
time unit positions of SSBs transmitted within one SSB period;
frequency domain unit positions of SSBs transmitted within one SSB period;
LBT configuration information;
LBT priority information;
time length implementing the LBT;
time length that can user channel resources after the LBT is completed.

The UE can obtain the mapping information of the SSB to the RO based on the foregoing configuration information, and the mapping information includes at least one of the following:

a mapping period of the SSB to the RO (e.g., the number of random access configuration periods required to complete at least one SSB-to-RO mapping);

a mapping pattern period of the SSB to the RO (e.g., time length ensuring same SSB-to-RO mapping in adjacent two mapping pattern periods, the number of required SSB-to-RO mapping periods, or the number of required random access configuration period).

The UE selects one SSB (i.e., obtains its SSB index), and SSB-RO mapping relationship (i.e., specifies the position and number of ROs corresponding to a certain SSB), and determines available random access occasions, that is, determining one or more random access signal occasions (PRACH occasions, RO) that are currently available for the selected SSB; wherein determining the valid RO can be confirmed according to the method described in the first embodiment, which details are not described herein; wherein available ROs can be determined as follows at least one of the following:

1. An available random access occasion in the configured random access occasions is determined, according to the configured available random access occasion indication. For example, if the random access occasion indication indicates that a random access occasion with an odd random access occasion time unit index is available, an available random access occasion may first be determined and then a valid random access occasion is determined based on the available random access occasion.

Figure 11:
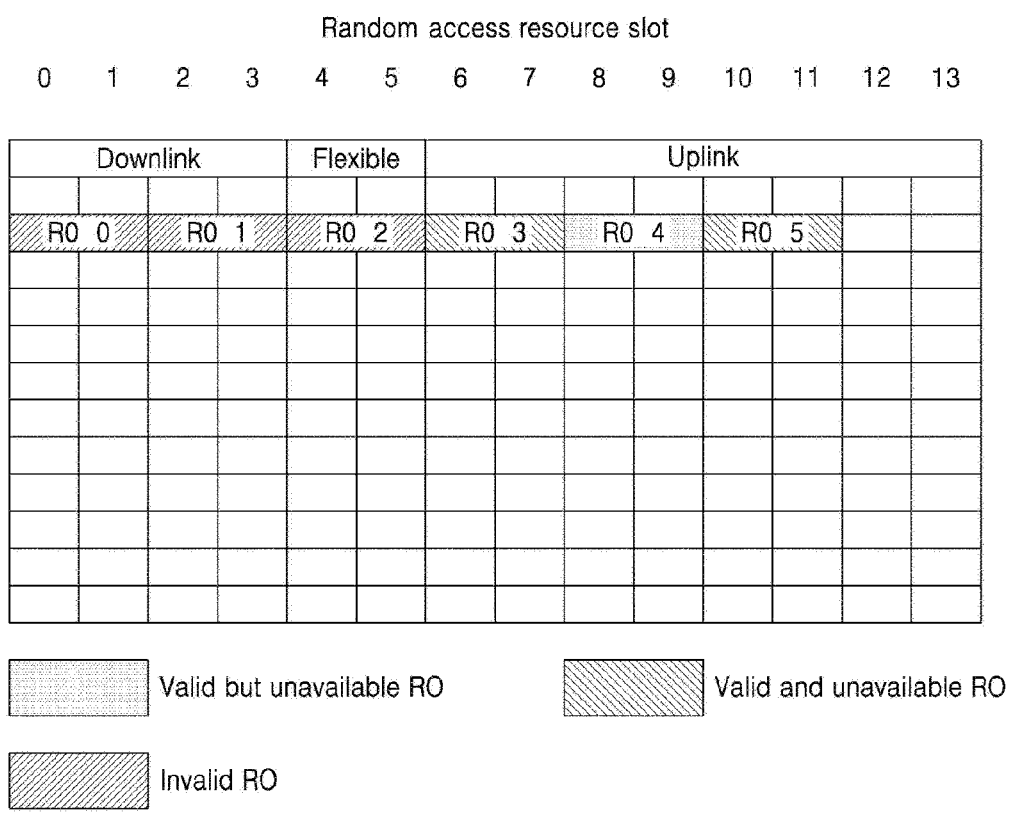
FIG. 11 is a diagram showing an example of an effective and available RO.

2. A valid random access occasion in the available random access occasions of the configured random access occasions is determined, according to the configured available random access occasion indication, for example, the random access occasion indication indicates that a random access occasion with an odd random access occasion time unit index is available. As shown in FIG. 11, RO 0, RO 1, and RO 2 are invalid ROs; RO 3, RO 4, and RO 5 are valid ROs; wherein, if the odd indexes are available ROs, the finally valid and available ROs are RO3 and RO5. In particular, the availability of the above random access occasion time unit indexes may be indexes (including both invalid and valid ROs) according to the configured random access occasions, or indexes re-performed according to the valid random access occasions.

The UE performs the LBT before determining one or more valid and available random access signal occasions, wherein the method for performing the LBT may adopt the methods in other embodiments or existing methods, which details are not described herein.

If the LBT is successful, the transmission of the corresponding uplink signal (for example, PRACH) is performed;

if the LBT fails, the LBT will be attempted again by waiting for a while; or the transmission is discarded.

Figure 8:
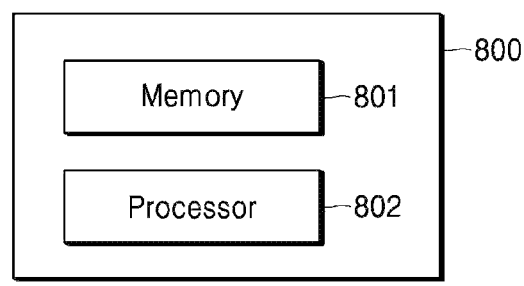
FIG. 8 is a schematic diagram of a user equipment for signal transmission according to an embodiment of the present disclosure.

This embodiment further provides a user equipment 800 for signal transmission, as shown in FIG. 8. The user equipment includes a memory 801 and a processor 802, which the memory stores computer executable instructions that, when executed by the processor, perform at least one of the methods corresponding to the various embodiments of the present disclosure. However, this is merely an example, and the user equipment 800 may additionally further include other elements. For example, the user equipment 800 may include a transceiver.

Specifically, for example, the processor may be configured to obtain random access configuration information, synchronization signal block configuration information, and timing advance (TA) value according to receiving/reading configuration information from the base station; and to obtain the mapping relationship of the synchronization signal block and the random access occasion, and select a sync signal block. The corresponding available random access occasions may be obtained according to the selected synchronization signal block and the mapping relationship between the synchronization signal block and the random access occasion; the LBT is performed before the TA of the first available random access occasion; the UE determines whether to transmit the PRACH on this random access occasion according to the LBT result.

Figure 9:
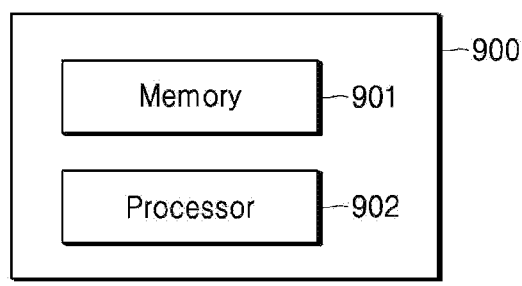
FIG. 9 is a schematic diagram of a base station device for signal transmission/reception according to an embodiment of the present disclosure.

The embodiment further provides a base station device 900 for signal transmission/reception. As shown in FIG. 9, the base station device includes a memory 901 and a processor 902, which the memory stores computer executable instructions that, when executed by the processor, carry out at least one method corresponding to each of the above embodiments of the present disclosure. However, this is merely an example, and the base station 900 may additionally further include other elements. For example, the base station 900 may include a transceiver.

Specifically, for example, the processor may transmit configuration information to the user equipment by the network device. A possible random access preamble signal is detected on the configured random access occasion; or the network device detects the uplink signal transmitted by the user equipment on the configured uplink transmission resource.

The configuration information may include at least one of the following: random access configuration information, synchronization signal block configuration information, and timing advance (TA) value.

Wherein, the random access configuration information includes at least one of: a random access configuration period; a random access occasion time unit index; a random access occasion frequency domain unit index; a random access occasion number; a random access preamble format; the number of random access preambles, the root sequence index, the cyclic shift value; the number of SSBs that can be mapped on a random access occasion.

Wherein, the synchronization signal block configuration information includes at least one of: SSB period size; the number of SSBs transmitted during an SSB period; time unit positions of SSBs transmitted within one SSB period; frequency domain unit positions of SSBs transmitted within one SSB period;

the timing advance value TA may be one of: a maximum timing advance value that a timing advance command can indicate; a cell specific timing advance value configured by a network device; and a user equipment specific timing advance value configured by a network device.

The present disclosure also provides a computer readable medium having stored thereon computer executable instructions that, when executed, perform any of the methods described in the embodiments of the present disclosure.

Specifically, for example, the processor may be configured to transmit configuration information to the user equipment side (the configuration information is the same as described above, and details are not described herein); and detect a possible random preamble signal on the configured random access occasions; or the network device detects the uplink signal transmitted by the user equipment on the configured uplink transmission resource.

The term "terminal device" or "UE" used herein may refer to any terminal having wireless communications capabilities, including but not limited to, mobile phones, cellular phones, smart phones, or personal digital assistants (PDAs), portable computers, image capture devices such as digital cameras, gaming devices, music storage and playback appliances and any portable units or terminals that have wireless communications capabilities, or Internet appliances permitting wireless Internet access and browsing and the like.

The term "base station" (BS) or "network device", used herein may also refer to eNB, eNodeB, NodeB or base transceiver station (BTS) etc., depending on the technology and terminology used.

The "memory" herein may be of any type suitable to the local technical environment and may be implemented using any suitable data storage technology, including but not limited to semiconductor-based memory devices, magnetic memory devices and systems, optical memory devices and systems, fixed memory and removable memory.

The processor may be of any type suitable to the local technical environment, and may include one or more of general purpose computers, special purpose computers, microprocessors, digital signal processors (DSPs) and processors based on a multi-core processor architecture, as non-limiting examples.

The foregoing are merely preferred embodiments of the present invention, and are not to limit the present invention, and any modification, equivalent and improvement within the spirit and principles of the present invention shall be covered in the protection scope of the present invention.

Those skilled in the art will appreciate that the present application includes apparatus related to performing one or more of the operations described herein. These devices may be specially designed and manufactured for required purposes, or may also include known devices in a general-purpose computer. These devices have computer programs stored therein that are selectively activated or reconfigured. Such computer programs may be stored in a device (e.g., a computer) readable medium or in any type of medium suitable for storing electronic instructions and respectively coupled to a bus, including but not limited to, any types of disks (including floppy disks, optical disks. CD-ROMs, and magnetic-optical disks), read-only memory (ROM), random access memory (RAM), erasable programmable ROM (EPROM), electrically erasable programmable ROM (EEPROM), flash memory, magnetic or optical cards. That is, the readable medium includes any medium that is stored or transmitted by a device (e.g., a computer) in a readable form.

It should be understood by those skilled in the art that computer program instructions may be used to realize each block in structure diagrams and/or block diagrams and/or flowcharts as well as a combination of blocks in the structure diagrams and/or block diagrams and/or flowcharts. It should be understood by those skilled in the art that these computer program instructions may be provided to general purpose computers, special purpose computers or other processors of programmable data processing means to be implemented, so that solutions designated in a block or blocks of the structure diagrams and/or block diagrams and/or flow diagrams are executed by computers or other processors of programmable data processing means.

It should be understood by those skilled in the art that the steps, measures and solutions in the operations, methods and flows already discussed in the present disclosure may be alternated, changed, combined or deleted. Further, other steps, measures and solutions in the operations, methods and flows already discussed in the present disclosure may also be alternated, changed, rearranged, decomposed, combined or deleted. Further, the steps, measures and solutions of the prior art in the operations, methods and operations disclosed in the present disclosure may also be alternated, changed, rearranged, decomposed, combined or deleted.

The foregoing are preferable examples of the invention. Ordinary technical personnel in the field may make some improvements and modifications without departing from principles of the invention, and these improvements and modifications also belong to the protection scope of the invention.

The invention claimed is:

1. A method performed by a user equipment (UE), the method comprising:
    receiving, from a base station, random access configuration information including mapping information between at least one random access occasion and at least one synchronization signal block (SSB) and a timing advance (TA) value;
    receiving an SSB from the base station;
    identifying a random access occasion corresponding to the received SSB and the TA value for the random access occasion based on the random access configuration information;
    performing listen before talk (LBT) based on the identified TA value; and
    transmitting, in response to the LBT being successful, a random access preamble on the identified random access occasion.

2. The method of claim 1, wherein the TA value comprises one of the following:
    a maximum TA value;
    a cell specific TA value configured by the base station; and
    a user equipment specific TA value configured by the base station.

3. The method of claim 1, further comprising:
    performing, in response to the LBT failing, an LBT before the TA value of a next random access occasion.

4. The method of claim 1, further comprising:
    identifying, in response to the LBT failing, whether to adjust a power ramping counter and/or a preamble transmission counter, according to a positional relationship between a next random access occasion and a previous random access occasion of the next random access occasion.

5. The method of claim 1, further comprising:
    in response to the LBT failing, adjusting a power ramping counter and/or a preamble transmission counter by adding 1 when one of the following conditions exists:
        a next random access occasion is a first available random access occasion in a time period in which the next random access occasion is located;
        the next random access occasion and a previous random access occasion of the next random access occasion belong to two different time periods; and
        an interval between the next random access occasion and the previous random access occasion of the next random access occasion is greater than or equal to a threshold, wherein the threshold is a pre-fixed time length, or a time length configured by the base station.

6. The method of claim 5, wherein the time period comprises at least one of the following:
    a mapping period of the SSB to the next random access occasion;
    a mapping pattern period of the SSB to the next random access occasion;
    a random access configuration period; and
    an SSB period.

7. The method of claim 1, further comprising:
identifying priority information of an uplink signal;
identifying, based on the identified priority information of the uplink signal, a timing advance value of the uplink signal (TA_ul);
performing the LBT before the TA_ul of a time-frequency resource of the uplink signal; and
transmitting, in response to the LBT being successful, the uplink signal, wherein the priority information of the uplink signal is obtained or preset from the base station.

8. The method of claim 7, wherein the timing advance value of the uplink signal with a higher priority is greater than or equal to the timing advance value of the uplink signal with a lower priority.

9. A method performed by a base station, the method comprising:
transmitting, to a user equipment (UE), random access configuration information including mapping information between at least one random access occasion and at least one synchronization signal block (SSB) and a timing advance (TA) value;
transmitting the at least one SSB; and
receiving, from the UE, a random access preamble on a random access occasion corresponding to one of the at least one SSB,
wherein the random access preamble is received in response to listen before talk (LBT) being successful at the UE, the LBT being performed based on the TA value for the random access occasion.

10. A user equipment (UE) comprising:
a transceiver; and
a processor coupled with the transceiver and configured to:
control the transceiver to receive, from a base station, random access configuration information including mapping information between at least one random access occasion and at least one synchronization signal block (SSB) and a timing advance (TA) value,
control the transceiver to receive an SSB from the base station,
identify a random access occasion corresponding to the received SSB and the TA value for the random access occasion based on the random access configuration information,
perform listen before talk (LBT) based on the identified TA value, and
control the transceiver to transmit, in response to the LBT being successful, a random access preamble on the identified random access occasion.

11. The UE of claim 10, wherein the TA value comprises one of the following:
a maximum TA value;
a cell specific TA value configured by the base station; and
a user equipment specific TA value configured by the base station.

12. The UE of claim 10, wherein the processor is further configured to:
perform, in response to the LBT failing, an LBT before the TA value of a next random access occasion.

13. The UE of claim 10, wherein the processor is further configured to:
identify priority information of an uplink signal,
identify, based on the identified priority information of the uplink signal, a timing advance value of the uplink signal (TA_ul),
perform the LBT before the TA_ul of a time-frequency resource of the uplink signal, and
control the transceiver to transmit, in response to the LBT being successful, the uplink signal, wherein the priority information of the uplink signal is obtained or preset from the base station.

14. The UE of claim 13, wherein the timing advance value of the uplink signal with a higher priority is greater than or equal to the timing advance value of the uplink signal with a lower priority.

15. The UE of claim 10, wherein the processor is further configured to:
identify, in response to the LBT failing, whether to adjust a power ramping counter and/or a preamble transmission counter, according to a positional relationship between a next random access occasion and a previous random access occasion of the next random access occasion.

16. The UE of claim 10, wherein the processor is further configured to:
in response to the LBT failing, adjust a power ramping counter and/or a preamble transmission counter by adding 1 when one of the following conditions exists:
a next random access occasion is a first available random access occasion in a time period in which the next random access occasion is located;
the next random access occasion and a previous random access occasion of the next random access occasion belong to two different time periods; and
an interval between the next random access occasion and the previous random access occasion of the next random access occasion is greater than or equal to a threshold, wherein the threshold is a pre-fixed time length, or a time length configured by the base station.

17. The UE of claim 16, wherein the time period comprises at least one of the following:
a mapping period of the SSB to the next random access occasion;
a mapping pattern period of the SSB to the next random access occasion;
a random access configuration period; and
an SSB period.

18. A base station comprising:
a transceiver; and
a processor coupled with the transceiver and configured to:
control the transceiver to transmit, to a user equipment (UE), random access configuration information including mapping information between at least one random access occasion and at least one synchronization signal block (SSB) and a timing advance (TA) value,
control the transceiver to transmit the at least one SSB, and
control the transceiver to receive, from the UE, a random access preamble on a random access occasion corresponding to one of the at least one SSB,
wherein the random access preamble is received in response to listen before talk (LBT) being successful at the UE, the LBT being performed based on the TA value for the random access occasion.

* * * * *